United States Patent
Nallampatti Ekambaram et al.

(10) Patent No.: US 10,177,797 B2
(45) Date of Patent: Jan. 8, 2019

(54) FILTER FOR USE IN TIME-OF-ARRIVAL ESTIMATION IN WIRELESS COMMUNICATIONS

(71) Applicant: QUALCOMM Incorporated, San Diego, CA (US)

(72) Inventors: Venkatesan Nallampatti Ekambaram, Bridgewater, NJ (US); Jubin Jose, Bound Brook, NJ (US); Xinzhou Wu, Hillsborough, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 14/593,920

(22) Filed: Jan. 9, 2015

(65) Prior Publication Data
US 2016/0205567 A1 Jul. 14, 2016

(51) Int. Cl.
*H04W 24/08* (2009.01)
*H04B 1/10* (2006.01)
*H04W 56/00* (2009.01)

(52) U.S. Cl.
CPC ...... *H04B 1/1036* (2013.01); *H04W 56/0055* (2013.01)

(58) Field of Classification Search
CPC .... H04B 1/1036; H04J 3/0667; H04J 3/0697; H04L 43/0864; H04L 47/283; H04L 7/00; H04W 84/18; H04W 92/12
See application file for complete search history.

(56) References Cited

U.S. PATENT DOCUMENTS

| | | |
|---|---|---|
| 8,325,704 B1 | 12/2012 | Lemkin et al. |
| 2009/0080501 A1* | 3/2009 | Kim .................. G01S 13/82 375/211 |
| 2010/0178882 A1* | 7/2010 | Kuroyanagi ........... G01S 19/33 455/98 |
| 2012/0117180 A1 | 5/2012 | Ranasinghe |
| 2012/0307675 A1 | 12/2012 | Lusilao-Zodi et al. |
| 2013/0058212 A1 | 3/2013 | Noy et al. |
| 2013/0237260 A1* | 9/2013 | Lin ....................... H04B 1/525 455/501 |
| 2013/0244689 A1* | 9/2013 | Keerthi ................ G01S 5/0215 455/456.1 |
| 2016/0306027 A1* | 10/2016 | Chrabieh ............. G01S 5/0215 |

OTHER PUBLICATIONS

Van Nieuwenhuyse A., et al., "Time of Arrival Based on Chirp Pulses as a means to Perform Localization in IEEE 802.15.4a Wireless Sensor Networks," Advances in Electrical and Computer Engineering, 2010, vol. 10 (2), pp. 65-70.

* cited by examiner

*Primary Examiner* — Awet Haile
(74) *Attorney, Agent, or Firm* — Muncy, Geissler, Olds & Lowe, P.C.

(57) ABSTRACT

Apparatus and method are provided for estimating the shortest time of arrival or the shortest round-trip time (RTT) of radio signals between communication devices in a wireless network. Filtering is performed by adaptive filters with suppressed side lobes adjustable in the time domain and widths of main lobes adjustable in the frequency domain to improve detection of signals on the shortest path of arrival or line-of-sight (LOS) path while mitigating the effects signals received from longer paths of arrival or non-line-of-sight (NLOS) paths.

29 Claims, 4 Drawing Sheets

FILTER FOR USE IN TIME-OF-ARRIVAL ESTIMATION IN WIRELESS COMMUNICATIONS

FIELD OF DISCLOSURE

Various embodiments described herein relate to filters, and more particularly, to filters for use in signal time-of-arrival estimation in wireless communications.

BACKGROUND

Radio signals in a wireless communication network may propagate directly from a transmitter to a receiver along a line of sight, or may be reflected by one or more objects before it is received by the receiver. In a typical indoor Wi-Fi network, for example, a signal transmitted from an access point to a mobile device or vice versa may be reflected by various obstacles, for example, walls, beams, furniture, appliances, or any surfaces that reflect radio waves. In a longer-range wireless network such as a cellular network, for example, a signal transmitted from a base station to a mobile device or vice versa may be reflected by various buildings, structures, pavements, hills or mountains, for example.

In various types of wireless communication networks, it is often desirable to obtain time-of-flight measurements between transmitters and receivers, for example, for determining relative distances or ranges between such devices which may be useful for positioning, navigation, or other uses. As such, it may be desirable to measure the shortest time of flight between a transmitter and a receiver, that is, the time of signal propagation through a line of sight. However, due to multiple reflections in typical indoor or outdoor environments, the signal received by the receiver may in effect represent a superposition of signals from multiple paths of propagation. Therefore, it may be useful to able to distinguish the shortest time of flight from longer times of flight due to reflections, multipath effects, or other effects.

SUMMARY

Certain aspects of the present disclosure are directed to apparatuses and methods for time-of-arrival estimations in communication networks in which a signal transmitted by one device may be capable of traveling over a line-of-sight (LOS) path or one or more non-line-of-sight (NLOS) paths before it is received by another device.

In an embodiment, a method of estimating, by a first communication device, a shortest time of arrival of a signal transmitted by a second communication device, the signal traveling over one or more paths before it is received by the first communication device, is provided, the method comprising: receiving a signal from the second communication device; filtering, by a receive filter, the signal to generate a filtered signal, the receive filter having applied characteristics of suppressed side lobes adjustable in a time domain and a main lobe having a width adjustable in a frequency domain based upon a signal-to-noise ratio (SNR) to at least a portion of the signal; and estimating the shortest time of arrival for the signal based upon the main lobe of the filtered signal.

In another embodiment, a mobile device is provided, the mobile device comprising: means for receiving a signal from an access point; means for filtering the signal to generate a filtered signal, the means for filtering the signal having applied characteristics of suppressed side lobes adjustable in a time domain and a main lobe having a width adjustable in a frequency domain based upon a signal-to-noise ratio (SNR) to at least a portion of the signal; and means for estimating a shortest time of arrival for the signal based upon the main lobe of the filtered signal.

In yet another embodiment, an access point is provided, the access point comprising: means for receiving a signal from a mobile device; means for filtering the signal to generate a filtered signal, the means for filtering the signal having applied characteristics of suppressed side lobes adjustable in a time domain and a main lobe having a width adjustable in a frequency domain based upon a signal-to-noise ratio (SNR) to the signal; and means for estimating a shortest time of arrival based upon the main lobe of the filtered signal.

BRIEF DESCRIPTION OF THE DRAWINGS

The accompanying drawings are presented to aid in the description of embodiments of the disclosure and are provided solely for illustration of the embodiments and not limitations thereof.

DETAILED DESCRIPTION

Figure 1:
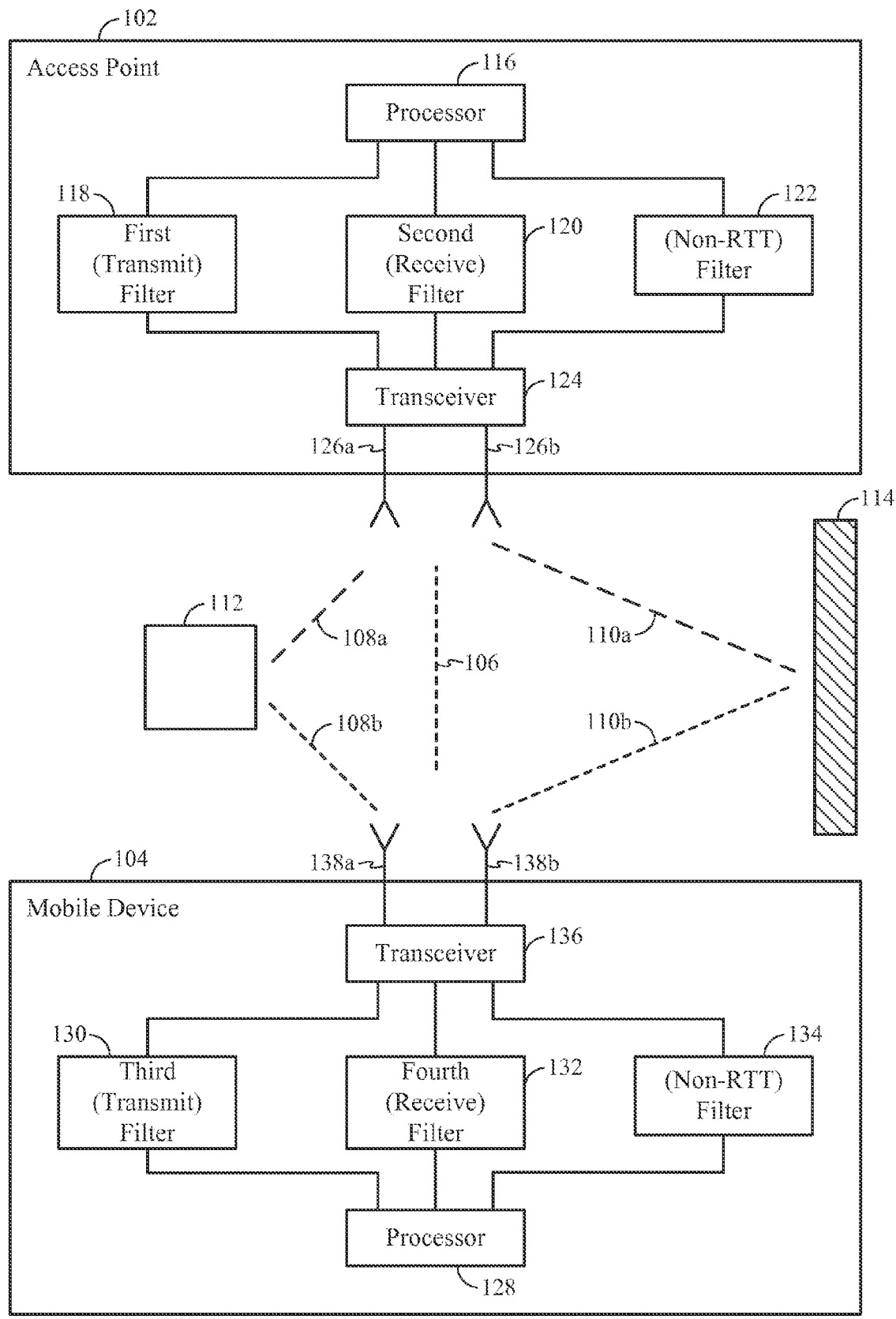
FIG. 1 is a diagram illustrating an example embodiment of an indoor Wi-Fi network in which radio signals between an access point and a mobile device travel along multiple paths.

Aspects of the disclosure are described in the following description and related drawings directed to specific embodiments. Alternate embodiments may be devised without departing from the scope of the disclosure. Additionally, well known elements will not be described in detail or will be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the embodiments. As used herein, the singular forms "a," "an," and "the," are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise.

Furthermore, many embodiments are described in terms of sequences of actions to be performed by, for example, elements of a computing device. It will be recognized that various actions described herein can be performed by specific circuits, such as application specific integrated circuits (ASICs), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Moreover, terms such as "transmitter," "receiver," or "transceiver" are intended to encompass any system, apparatus, device, component, structure, hardware, software, firmware, or any combination thereof, that are capable of, respectively, transmitting and/or receiving digital or analog signals, data, instructions, commands, information, bits, symbols, chips, or any combination thereof. Transmission and/or reception of signals, data, instructions, commands, information, bits, symbols, chips, or any combination thereof may occur over one or more analog or digital communication links, including but not limited to wireless radio links.

Although exemplary embodiments of the disclosure are described with respect to filters for improved time-of-arrival estimation in wireless communications, and more specifically, in wireless communications in which at least some of the communication paths are non-line-of-sight (NLOS) paths, it will be understood by persons skilled in the art that the principles disclosed herein are also applicable to time-of-arrival estimations in various other communication links.

FIG. 1 is a diagram illustrating an embodiment of an indoor Wi-Fi network in which radio signals between an access point 102 and a mobile device 104 travel along multiple paths, including, for example, a direct line-of-sight (LOS) path shown as dashed lines 106 and non-line-of-sight (NLOS) paths shown as dashed lines 108a, 108b, 110a and 110b. In the example shown in FIG. 1, the Wi-Fi network is implemented in an indoor environment which includes an object 112 which is capable of reflecting radio signals. Such an object 112 may be a piece of furniture, an appliance, or an electronic device, for example, or any metal or non-metal object that reflects radio signals. Also shown in the indoor environment of FIG. 1 is a wall 114 which may also reflect radio signals. In FIG. 1, the NLOS paths (represented by dashed lines 108a and 108b) between the access point 102 and the mobile device 104 are shown as reflected paths due to the presence of the object 112, whereas the NLOS paths (represented by dashed lines 110a and 110b) between the access point 102 and the mobile device 104 are shown as reflected paths due to the presence of the wall 114. For simplicity of illustration, only two sets of NLOS paths are shown in FIG. 1. In reality, a radio signal transmitted by a transmitter may be reflected multiple times by multiple objects before it is received by a receiver.

In an embodiment, the access point 102 comprises a processor 116, a first (transmit) filter 118 and a second (receive) filter 120 for filtering transmit and receive signals, respectively, for estimating the shortest time of signal propagation between the mobile device 104 and the access point 102, and another filter 122 for filtering signals other than for the purpose of estimating the shortest time of signal propagation. In the embodiment shown in FIG. 1, the first filter 118, the second filter 120 and the filter 122 are coupled to the processor 116. In an embodiment in which the shortest time of signal propagation is estimated by measuring a round trip time (RTT) of signal travel between the access point 102 and the mobile device 104, the first filter 118 comprises an RTT transmit filter, the second filter 120 comprises an RTT receive filter, and the filter 122 for other purposes, such as for filtering data-carrying signals, comprises a non-RTT filter.

In an embodiment, the access point 102 further comprises a transceiver 124 coupled to the first filter 118, the second filter 120 and the filter 122 to transmit and receive radio signals for the purpose of estimating the shortest time of signal propagation as well as for other purposes, such as for exchange of data between the access point 102 and the mobile device 104. In an embodiment, one or more antennas may be coupled to the transceiver 124 of the access point 102 for transmitting and receiving data. For example, in a multiple-input-multiple-output (MIMO) network, multiple antennas may be provided for spatial diversity or spatial multiplexing. In the embodiment shown in FIG. 1, a plurality of antennas, for example, antennas 126a and 126b, are coupled to the transceiver 124 of the access point 102.

In an embodiment, the mobile device 104 also comprises a processor 128, a third (transmit) filter 130 and a fourth (receive) filter 132 for filtering transmit and receive signals, respectively, for estimating the shortest time of signal propagation between the access point 102 and the mobile device 104, and another filter 124 for filtering signals other than for the purpose of estimating the shortest time of signal propagation. In the embodiment shown in FIG. 1, the third filter 130, the fourth filter 132 and the filter 134 are coupled to the processor 128. In an embodiment in which the shortest time of signal propagation is estimated by measuring a round trip time (RTT) of signal travel between the mobile device 104 and the access point 102, the third filter 130 comprises an RTT transmit filter, the fourth filter 132 comprises an RTT receive filter, and the filter 134 for other purposes, such as for filtering data-carrying signals, comprises a non-RTT filter.

In an embodiment, the mobile device 104 further comprises a transceiver 136 coupled to the third filter 130, the fourth filter 132 and the filter 134 to transmit and receive radio signals for the purpose of estimating the shortest time of signal propagation as well as for other purposes, such as for exchange of data between the mobile device 104 and the access point 102. In an embodiment, one or more antennas may be coupled to the transceiver 136 of the mobile device 104 for transmitting and receiving data in a MIMO network, for example. In the embodiment shown in FIG. 1, a plurality of antennas, for example, antennas 138a and 138b, are coupled to the transceiver 136 of the mobile device 104.

Figure 2:
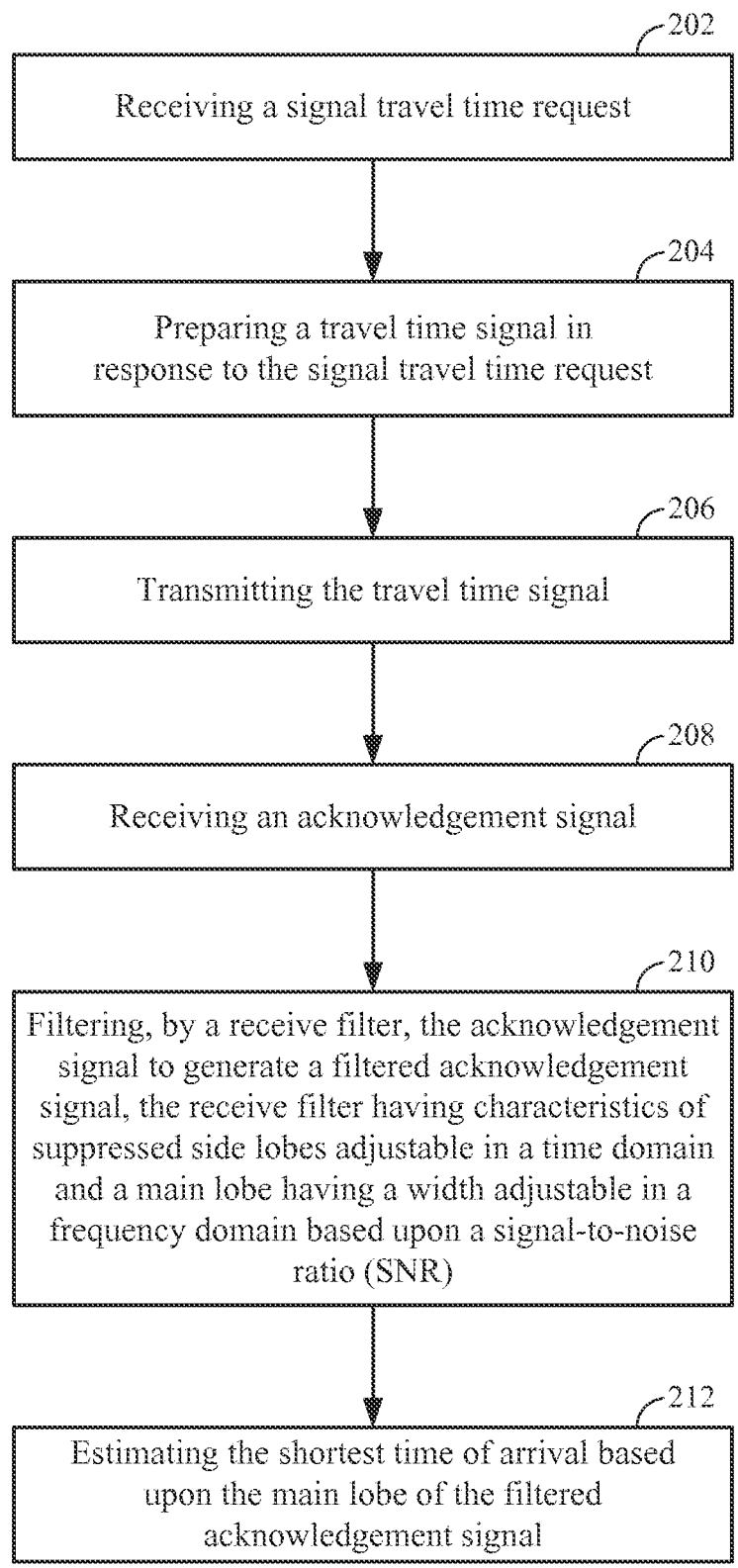
FIG. 2 is flowchart illustrating an example embodiment of a method of estimating a shortest time of arrival of a radio signal using a filter having suppressed side lobes on the sides of a main lobe adjustable in a time domain and a frequency response having a bandwidth adjustable in a frequency domain based upon a signal-to-noise ratio (SNR).

FIG. 2 is flowchart illustrating an embodiment of a method of estimating a shortest time of arrival of a radio signal using a filter having suppressed side lobes adjustable in a time domain and a main lobe having a width adjustable in a frequency domain based upon a signal-to-noise ratio (SNR). In an embodiment, a first communication device, which may be a mobile device, an access point, or some other like device in a Wi-Fi network or some other like wireless communication network may, for example, receive a signal travel time request in block 202 from a second communication device. Here, for example, a second communication device may be another access point, mobile device, or some other like device. In an embodiment in which a round trip time (RTT) is to be measured, the signal travel time request may be an RTT request. In a further embodiment, the RTT request may be encapsulated in an RTT request packet. In FIG. 1, for example, the signal travel time request may be transmitted by the transceiver 124 of the access point 102 and received by the transceiver 136 of the mobile device 104. Alternatively, the signal travel time request may be transmitted by the transceiver 136 of the mobile device 104 and received by the transceiver 124 of the access point 102.

Referring to FIG. 2, the first communication device may prepare a signal travel time packet in response to the signal travel time request in block 204. In an embodiment in which an RTT is to be measured, the signal travel time packet may be an RTT packet. In an embodiment, the signal travel time packet may be prepared, for example, by the processor 128 or elsewhere in the mobile device 104 if the mobile device 104 is the recipient of the signal travel time request. Alternatively, the signal travel time packet may be prepared, for example, by the processor 116 or elsewhere in the access point 102 if the access point 102 is the recipient of the signal travel time request.

Referring to FIG. 2, after the signal travel time packet is prepared, the first communication device may transmit the signal travel time packet to the second communication device in block 206. The second communication device may receive the signal travel time packet and generate a signal (for example, a signal which may comprise an acknowledgement (ACK) packet or the like) in response to the signal travel time packet. The first communication device may "listen" for such a signal (for example, a signal comprising an ACK packet or the like) which is expected to be transmitted by the second communication device in response to the signal travel time packet. A signal (for example, a signal comprising an ACK packet or the like) may be received by the first communication device in block 208. As mentioned, in some indoor and outdoor environments, radio signals carrying the ACK packet transmitted from the second communication device to the first communication device may travel over one or more NLOS paths and/or over a direct LOS path, as illustrated in FIG. 1. In an embodiment, transmitting the signal travel time packet in block 206 and receiving the ACK packet or the like in block 208 in FIG. 2 may be performed by the transceiver 136 in the mobile device 104, or alternatively, by the transceiver 124 in the access point 102 as shown in FIG. 1.

Referring to FIG. 2, after receiving the signal (for example, a signal comprising an ACK packet or the like), the first communication device may filter at least a portion of the signal (for example, a signal comprising an ACK packet or the like) to generate a filtered signal (for example, a filtered ACK packet or the like) in block 210. In an embodiment, the signal may be filtered by a receive filter having applied characteristics of suppressed side lobes on the sides of a main lobe adjustable in the time domain and a frequency response having a bandwidth adjustable in the frequency domain based on the signal-to-noise ratio (SNR), as shown in block 210 of FIG. 2. Examples of receive filter characteristics with suppressed side lobes adjustable in the time domain and width of the main lobe or bandwidth adjustable in the frequency domain based on the SNR are described in further detail below. In an embodiment in which the mobile device 104 in FIG. 1 receives the signal (for example, a signal comprising an ACK packet or the like), for example, filtering of at least a portion of the signal (for example, the ACK packet or the like) in the time and frequency domains may be performed by the fourth filter 132 in the mobile device 104. Alternatively, if the access point 102 in FIG. 1 receives the signal, then filtering of at least a portion of the signal in the time and frequency domains may be performed by the second filter 120 in the access point 102. In an embodiment in which the RTT is to be measured, the second filter 120 or the fourth 132 may be an RTT receive filter.

Referring to FIG. 2, after at least a portion of the signal (for example, a signal comprising an ACK packet or the like) is filtered in the time and frequency domains by the receive filter in block 210, the shortest time of arrival of signal (for example, a signal comprising the ACK packet) may be estimated based, at least in part, on the main lobe of the first arrived path in the filtered ACK packet in block 212. As will be described in further detail below, side lobes may be present in a sinc (i.e., $\sin(x)/x$) response in the time domain corresponding to the main lobe of later signal arrivals received from NLOS paths. Such side lobes may interfere with the main lobe of the sinc corresponding to the desired shortest or LOS path. In an embodiment in which the mobile device 104 in FIG. 1 receives the ACK packet, the shortest time of arrival may be estimated by the processor 128 or elsewhere in the mobile device 104. Alternatively, in an embodiment in which the access point 102 in FIG. 1 receives the ACK packet, the shortest time of arrival may be estimated by the processor 116 or elsewhere in the access point 102.

In a further embodiment, a shortest round trip time (RTT) between the first communication device and the second communication device may be estimated by utilizing a transmit filter to filter the signal travel time packet or RTT packet before it is transmitted by the first communication device to the second communication device, as well as a receive filter to filter at least a portion of the signal (for example, a signal comprising the ACK packet or the like) received by the first communication device. In an embodiment, the block 204 of preparing a signal travel time packet in response to the signal travel time request as shown in FIG. 2 includes block of filtering, by a transmit filter, the signal travel time packet to generate a filtered signal travel time packet. In an embodiment in which the shortest RTT is to be measured, the signal travel time packet may be an RTT packet. In an embodiment, block 206 of transmitting the signal travel time packet as shown in FIG. 2 includes transmitting a filtered signal travel time packet, which may be a filtered RTT packet in an embodiment in which the shortest RTT is to be measured.

In an embodiment, the transmit filter for filtering the signal travel time packet or RTT packet before transmission may be implemented in the mobile device 104 or the access point 102 as shown in FIG. 1. For example, if the mobile device 104 is the device that prepares the signal travel time packet, then filtering of the signal travel time packet may be performed by the third filter 130 in the mobile device 104. On the other hand, if the access point 102 is the device that prepares the signal travel time packet or RTT packet, then filtering of the signal travel time packet or RTT packet may be performed by the first filter 118 in the access point 102.

In an embodiment, the transmit filter may also have the characteristics of suppressed side lobes on the sides of a main lobe adjustable in the time domain and a frequency response having a bandwidth adjustable in the frequency domain based upon the SNR. However, the filter response of the transmit filter need not be identical to that of the receiver filter for filtering received ACK packet. In an embodiment, the width of the main lobe of the transmit filter may be slightly larger than the main lobe of the receive filter. In other words, the bandwidth of the transmit filter may be designed to be slightly larger than the bandwidth of the receive filter. In an embodiment, the bandwidth of the transmit filter may be expanded by an expansion factor applied to the bandwidth of the receive filter while other characteristics of the transmit filter remain substantially the same as those of the receive filter. Alternatively, different sets of filter coefficients may be applied to the transmit filter and the receive filter. If the filter coefficients or bandwidth of the transmit filter is different from those of the receive filter, then the filter coefficients or the bandwidth expansion factor would need to be transmitted or signaled to the device that receives the signal travel time packet.

For example, referring to FIG. 1, if the mobile device 104 is the device that prepares and transmits the signal travel time packet, and the filter response of the third filter 130 in the mobile device 104 is initially different from that of the second filter 120 in the access point 102, then the filter coefficients or at least the bandwidth expansion factor of the third filter 130 in the mobile device 104 may be signaled to the access point 102 to allow the second filter 120 in the access point 102 to dynamically adjust its filter coefficients to receive the signal travel time packet. On the other hand, if the access point 102 is the device that prepares and transmits the signal travel time packet, and the filter response of the first filter 118 in the access point 102 is initially different from that of the fourth filter 132 in the mobile device 104, then the filter coefficients or at least the bandwidth expansion factor of the first filter 118 in the access point 102 may be signaled to the mobile device 104 to allow the fourth filter 132 in the mobile device 104 to dynamically adjust its filter coefficients to receive the signal travel time packet.

In an embodiment, the fourth filter 132 or the second filter 120 in the respective communication device for measuring the shortest time of arrival or shortest RTT of signals does not require a change to physical layer signaling in a Wi-Fi network. For example, existing IEEE 802.11 OFDM packets may be used as signal travel time packets or RTT packets for time-of-arrival measurements. In an embodiment, the receive filter in the frequency domain may be applied within the existing bandwidth to the channel frequency response (CFR). In an embodiment, an adaptive filter having the characteristics of a Chebyshev filter may be implemented as a receive filter with adjustable filter coefficients for achieving adjustable main lobe width and side lobe suppression. While Chebyshev filters may be implemented for side lobe suppression, other types of conventional filters with adjustable filter coefficients may also be implemented within the scope of the disclosure.

Figure 3:
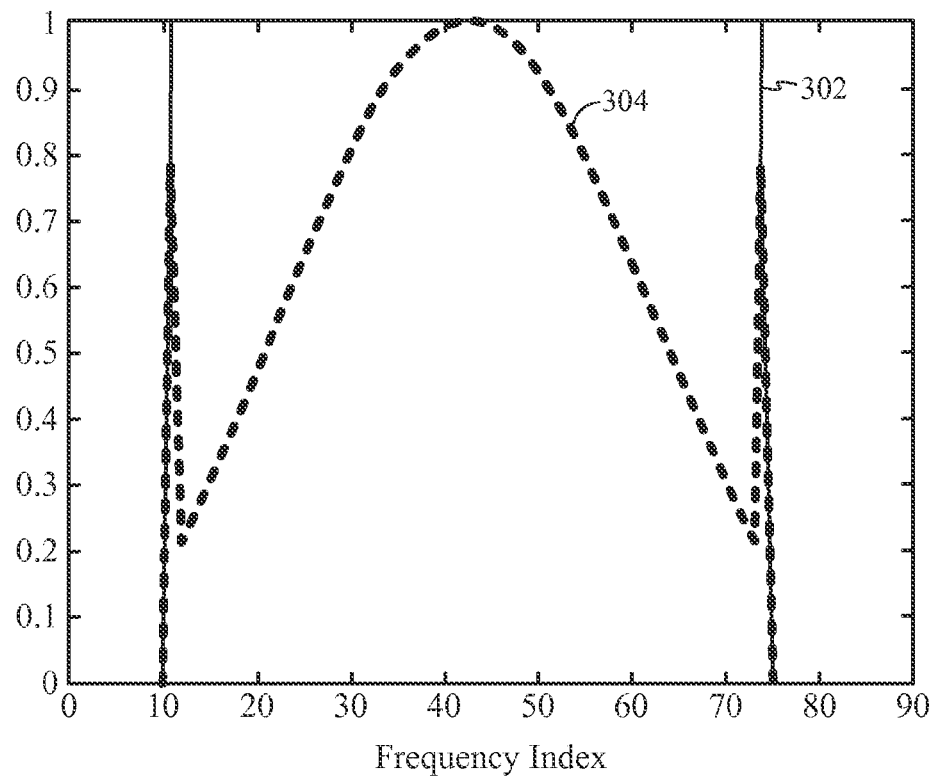
FIG. 3 is a graph illustrating a frequency response of an example embodiment of a receive filter used for estimating a shortest time of arrival of a radio signal.
Figure 4:
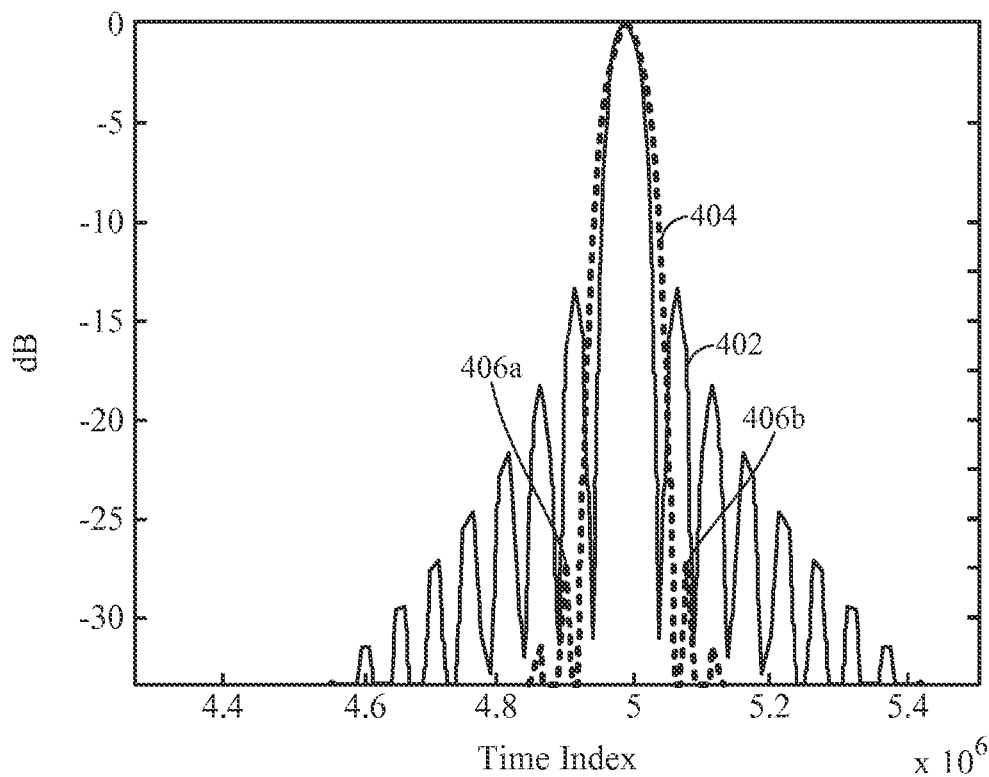
FIG. 4 is a graph illustrating a time domain response of an example embodiment of a receive filter used for estimating a shortest time of arrival of a radio signal.

FIG. 3 is a graph illustrating a frequency response of an embodiment of a receive filter used for estimating a shortest time of arrival of a radio signal. For simplicity of illustration, it is assumed that the received signal spectrum of a Wi-Fi signal is a substantially rectangular-shaped curve 302 in the frequency domain, as shown in FIG. 3. The corresponding time-domain response of such a rectangular-shaped signal spectrum in the frequency spectrum is a sinc curve 402 as shown in time-domain graph of FIG. 4. It should be noted that the ordinate indicating the magnitude of filter response in the frequency-domain graph of FIG. 3 is on a linear scale, whereas the ordinate indicating the magnitude of filter response in the time-domain graph of FIG. 4 is on a logarithmic scale in decibels (dB).

Referring to FIG. 3, the response of a Chebyshev filter in the frequency domain is shown as a curve 304. In an embodiment, the width of the main lobe or bandwidth of the Chebyshev filter may be designed to substantially match the rectangular spectrum of received signals, as shown in the frequency-domain graph of FIG. 3. In FIG. 3, the magnitude of the frequency response of the Chebyshev filter is shown as curve 304, whereas the rectangular received signal spectrum is shown as curve 302. In the time-domain graph of FIG. 4, the time-domain response of the rectangular received signal spectrum is shown as the sinc curve 402, whereas the response of the Chebyshev filter in the time domain is shown as a curve 404 with significantly suppressed side lobes, including, for example, first left and right side lobes 406a and 406b, respectively.

In an embodiment, the filter coefficients for the Chebyshev filter may be optimized for heavy suppression of the magnitude of the first side lobes. For example, the filter coefficients may be optimized to obtain a suppression of about −30 dB at the first side lobes 406a and 406b as shown in FIG. 4. With heavy suppression of the side lobes, if an earlier arrived signal received from a shorter path is one sample apart from the later arrived signal received from a longer path, then the earlier arrived signal would suffer less side lobe interference after filtering, thereby allowing the earlier arrived signal to distinguish more easily from the later arrived signal. In an embodiment, with heavy suppression of side lobes in a Chebyshev filter, the main lobe may be expanded slightly, as illustrated by a comparison of the Chebyshev filter response curve 404 to the sinc curve 402 in the time-domain graph of FIG. 4. With a slight expansion of the main lobe in the Chebyshev filter, resolution may be reduced slightly due to a slight reduction in the effective signal bandwidth after the windowing, but suppression of the side lobes would allow the filter to easily distinguish an earlier arrived signal on a LOS path from a later arrived signal on an NLOS path.

In an embodiment, the time-domain response of the window for the Chebyshev filter is given as follows:

$$W(k) = \frac{\cos\left(M\cos^{-1}\left[\beta\cos\left(\frac{\pi k}{M}\right)\right]\right)}{\cosh[M\cosh^{-1}(\beta)]}$$

$$k = 0, 1, \ldots, M - 1$$

$$\beta = \cosh\left[\frac{1}{M}\cosh^{-1}(10^\alpha)\right]$$

In this embodiment, the side lobe level in dB is given by $-20\alpha$, where the value of $\alpha$ is chosen based upon the value of signal-to-noise ratio (SNR). The choice of $\alpha$ may be determined in various manners. In practice, it may be desirable to keep the side lobes below the noise floor. In an embodiment, the value of $\alpha$ may be determined by the following:

SNR=SIG_POW/NOISE_POW where SNR is the signal-to-noise ratio in absolute value (not decibels), SIG_POW is the signal power is absolute value, and NOISE_POW is the noise power in absolute value. Thus, the noise power is given by

NOISE_POW=SIG_POW/SNR

A parameter, NOISE_STD, which is the square root of noise power, is given by

NOISE_STD=sqrt(SIG_POW/SNR)

Assuming that the peak value of the received signal is given by MAX_PEAK, the noise floor relative to this peak value is given by

NOISE_FLOOR=NOISE_STD/MAX_PEAK

Since it may be desirable to account for the maximum noise peak, it may be desirable to maintain a threshold that a given factor $\beta$ higher than the NOISE_FLOOR. For example, the factor $\beta$ may be set at 15. In an embodiment, the noise floor (in decibels) may be chosen as $\beta$ times higher than the estimated noise floor as follows:

NOISE_FLOOR_DB=20*log 10($\beta$*NOISE_FLOOR)

where NOISE_FLOOR_DB is the noise floor in decibels. In an embodiment, the value of $\alpha$ may be set as follows:

$\alpha$=NOISE_FLOOR_DB/(−20)

In an embodiment, a slightly larger value of $\alpha$ may be chosen to account for estimation errors in practice. In a further embodiment, the filter coefficients may be further modified to account for effects of direct current (DC) tone, guard tones, spurious effects, or other effects in the transmit or receive filters.

In an embodiment, in order to reduce the potential loss in resolution due to the expansion of the main lobe, the filter may be selectively applied, for example, when the received signal is determined to be an NLOS signal, through an NLOS detection algorithm. An NLOS detection algorithm may include one or more detection criteria, for example, a criterion based upon a determination of whether the first peak detected by the receiver is not the strongest peak. If the first peak and the strongest peak coincide, then the receive filter may be disabled to obtain a better resolution, for example.

Figure 5:
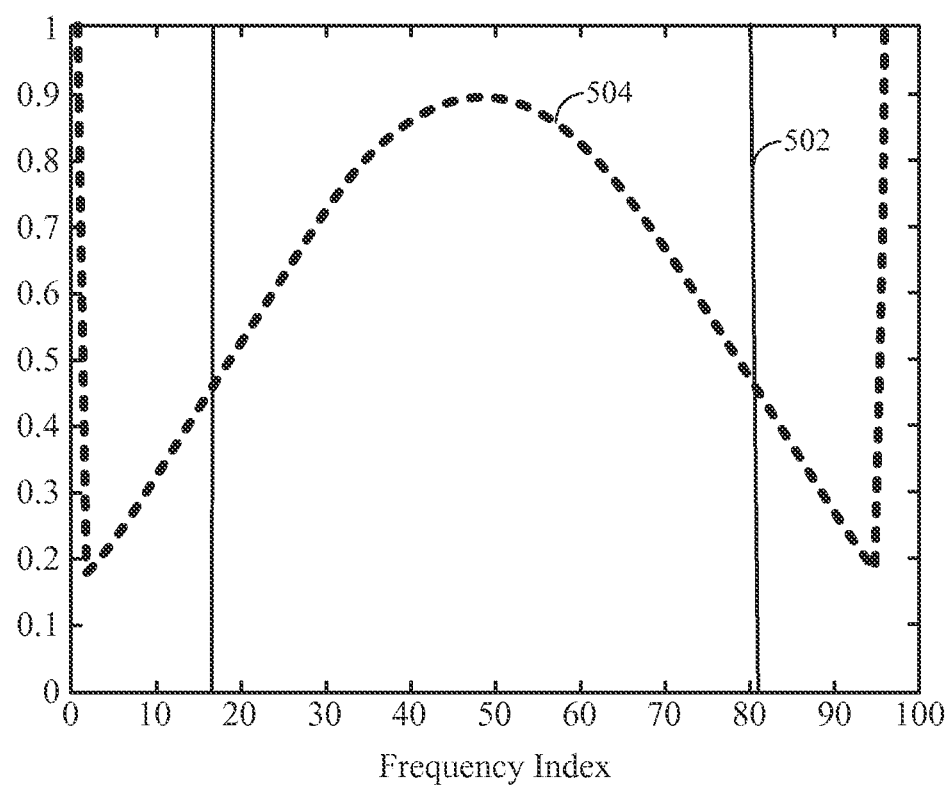
FIG. 5 is a graph illustrating a frequency response an example embodiment of a transmit filter used for estimating a shortest time of arrival of a radio signal.

In an embodiment, an adaptive Chebyshev filter may also be implemented as a transmit filter, such as the third filter 130 in the mobile device 104 or the first filter 118 in the access point 102, with a similar filter response to that of a receive filter but with a slight expansion in the bandwidth. An example of a filter response of a Chebyshev transmit filter for estimating the shortest time of arrival of a radio signal is illustrated in the frequency-domain graph of FIG. 5. Like FIG. 3, the ordinate indicating the magnitude of the transmit filter response in FIG. 5 is on a linear scale. The response of the Chebyshev filter in the frequency domain is illustrated by curve 504, which has an expanded bandwidth compared to the substantially rectangular received signal spectrum shown as curve 502. By expanding the bandwidth of the transmit filter slightly more than the received signal spectrum or the bandwidth of the receive filter, the main lobe width of the transmit filter may retained while the side lobes of the transmit filter may be suppressed.

If the bandwidth of the transmit filter is expanded to be larger than that of the receive filter, or if the filter coefficients of the transmit filter are different from those of the receive filter, the filter coefficients or the bandwidth expansion factor for the transmit filter in the first communication device would need to be signaled to the second communication device, to allow the second communication device to adjust its filter coefficients accordingly. In an embodiment, the transmit filter may also be an adaptive filter having coefficients adjustable based on various factors. For example, if the first communication device has no transmissions in an adjacent band, then a transmit filter with a larger bandwidth expansion factor may be used. The filter coefficients for the transmit filter in the first communication device may also be dynamically adapted based on channel occupancy, for example, and these filter coefficients may be signaled to the transceiver in the second communication device.

In a further embodiment, a spectral mask may be implemented in the transmit filter of the first communication device for smoother roll-off of the signal spectrum. Such a spectral mask may impose additional constraints on the transmit filter when the filter coefficients are being optimized. For example, in practical situations, it may not be desirable to have sharp transitions at the edges of a substantially rectangular signal spectrum, and constraints imposed by a spectral mask may be suitably incorporated in the filter in a conventional manner. Moreover, referring to FIG. 1, in an embodiment in which the time-of-arrival estimation is based on an estimation of round trip time (RTT), the third filter 130 and the fourth filter 132 in the mobile device 104 may have filter characteristics different from those of the non-RTT filter 134 for filtering data-carrying signals other than for the purpose of time-of-arrival or RTT estimation by the mobile device 104. Likewise, the first filter 118 and the second filter 120 in the access point 102 may have filter characteristics different from those of the non-RTT filter 122 for filtering data-carrying signals other than for the purpose of time-of-arrival or RTT estimation by the access point 102.

Although specific embodiments have been described with respect to time-of-arrival estimations in Wi-Fi communications in an indoor environment, where signals may travel over line-of-sight (LOS) as well as non-line-of-sight (NLOS) paths, the principles disclosed by the foregoing description are also applicable to various other types of communications. For example, instead of implementing the transmit and receive filters in an access point or a mobile device in a Wi-Fi network, the transmit and receive filters for improved time-of-arrival estimation may also be implemented in a Bluetooth or ultra wideband (UWB) network. Moreover, such filters may also be implemented in a long-range communication network such as a cellular network, for example, where radio signals may also travel over line-of-sight (LOS) as well as non-line-of-sight (NLOS) paths, for example, due to reflections from buildings, structures, hills or mountains.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm blocks described in connection with the embodiments disclosed herein may be implemented as electronic hardware, computer hardware and software, or other variations/combinations of both hardware and software. To clearly illustrate various aspects, components, blocks, modules, circuits, and steps have been described above generally in terms of their functionality. Whether such functionality is implemented as hardware or a combination of hardware and software depends upon the particular application and design constraints imposed on the overall system. Skilled artisans may implement the described functionality in varying ways for each particular application, but such implementation decisions should not be interpreted as causing a departure from the scope of the disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the disclosure may include a computer readable medium embodying a method of filtering for improved time-of-arrival estimation in wireless communications. Accordingly, the scope of the appended claims is not limited to illustrated examples and any means for performing the functionality described herein are included in embodiments of the disclosure.

While the foregoing disclosure describes illustrative embodiments, it should be noted that various changes and modifications could be made herein without departing from the scope of the appended claims. The functions, steps or actions in the method and apparatus claims in accordance with the embodiments described herein need not be performed in any particular order unless explicitly stated otherwise. Furthermore, although elements may be described or claimed in the singular, the plural is contemplated unless limitation to the singular is explicitly stated.

What is claimed is:

1. A method of estimating, by a first communication device, a shortest time of arrival of a signal transmitted by a second communication device, the signal traveling over one or more paths before it is received by the first communication device, the method comprising:
   receiving a signal from the second communication device;
   filtering, by a receive filter, the signal received from the second communication device to generate a filtered signal, the receive filter having applied characteristics of suppressed side lobes adjustable in a time domain and a main lobe having a width adjustable in a frequency domain based upon a signal-to-noise ratio (SNR) to at least a portion of the signal; and
   estimating the shortest time of arrival for the signal received from the second communication device based upon the main lobe of the filtered signal,
   wherein the receive filter has the applied characteristics such that the side lobes on both sides of the main lobe are suppressed in the time domain to a greater degree than side lobes on both sides of a main lobe of a sinc filter response in the time domain.

2. The method of claim 1, further comprising:
   receiving a round trip time (RTT) request from the second communication device;
   preparing an RTT packet in response to the RTT request; and
   transmitting the RTT packet to the second communication device,
   wherein the signal received from the second communication device from which the filtered signal is generated comprises an acknowledgement (ACK) packet for estimating a shortest RTT of signal travel between the first communication device and the second communication device.

3. The method of claim 2,
   wherein preparing the RTT packet in response to the RTT request comprises filtering, by a transmit filter, the RTT packet to generate a filtered RTT packet, and
   wherein transmitting the RTT packet to the second communication device comprises transmitting the filtered RTT packet to the second communication device.

4. The method of claim 3, wherein the transmit filter has applied characteristics of suppressed side lobes adjustable in the time domain and a main lobe having a width adjustable in the frequency domain based upon the SNR to at least a portion of the RTT packet.

5. The method of claim 4, wherein a width of the main lobe of the transmit filter is larger than a width of the main lobe of the receive filter in the frequency domain.

6. The method of claim 4, further comprising transmitting one or more of the characteristics of the transmit filter to the second communication device.

7. The method of claim 3,
   wherein a frequency response of the receive filter is such that a width of the main lobe of the receive filter in the frequency domain is substantially equal to a width of a spectrum of received signals in the frequency domain, and
   wherein a frequency response of the transmit filter is such that a width of the main lobe of the transmit filter in the frequency domain is wider than the width of the spectrum of received signals in the frequency domain.

8. The method of claim 1, wherein the receive filter comprises a Chebyshev filter.

9. The method of claim 1, wherein a frequency response of the receive filter is such that the main lobe of the receive filter in the frequency domain includes the following characteristics:
   a maximum response occurs substantially at a center frequency of the main lobe, and
   the response monotonically decreases on both sides away from the center frequency of the main lobe.

10. The method of claim 1, wherein a frequency response of the receive filter is such that the side lobes on both sides of the main lobe are suppressed equally in the time domain.

11. A mobile device, comprising:
    means for receiving a signal from an access point;
    means for filtering the signal received from the access point to generate a filtered signal, the means for filtering the signal having applied characteristics of suppressed side lobes adjustable in a time domain and a main lobe having a width adjustable in a frequency domain based upon a signal-to-noise ratio (SNR) to at least a portion of the signal; and
    means for estimating a shortest time of arrival for the signal received from the access point based upon the main lobe of the filtered signal,
    wherein the means for filtering has the applied characteristics such that the side lobes on both sides of the main lobe are suppressed in the time domain to a greater degree than side lobes on both sides of a main lobe of a sinc filter response in the time domain.

12. The mobile device of claim 11, further comprising:
    means for receiving a round trip time (RTT) request from the access point;
    means for preparing an RTT packet in response to the RTT request; and
    means for transmitting the RTT packet to the access point,
    wherein the signal received from the access point from which the filtered signal is generated comprises an acknowledgement (ACK) packet for estimating a shortest RTT of signal travel between the mobile device and the access point.

13. The mobile device of claim 12,
wherein the means for preparing the RTT packet in response to the RTT request comprises means for filtering the RTT packet to generate a filtered RTT packet, and
wherein the means for transmitting the RTT packet to the access point comprises means for transmitting the filtered RTT packet to the access point.

14. The mobile device of claim 13, wherein the means for filtering the RTT packet has characteristics of suppressed side lobes adjustable in the time domain and a main lobe having a width adjustable in the frequency domain based upon the SNR.

15. The mobile device of claim 14, wherein a width of the main lobe of the means for filtering the RTT packet is larger than a width of the main lobe of the means for filtering the signal which comprises the ACK packet in the frequency domain.

16. The mobile device of claim 14, further comprising means for transmitting the characteristics of the means for filtering the RTT packet to the access point.

17. The mobile device of claim 13,
wherein a frequency response of the means for filtering the signal is such that a width of the main lobe of the means for filtering the signal in the frequency domain is substantially equal to a width of a spectrum of received signals in the frequency domain, and
wherein a frequency response of the means for filtering the RTT packet is such that a width of the main lobe of the means for filtering the RTT packet in the frequency domain is wider than the width of the spectrum of received signals in the frequency domain.

18. The mobile device of claim 11, wherein the means for filtering the ACK packet comprises a Chebyshev filter.

19. The mobile device of claim 11, wherein a frequency response of the means for filtering the signal is such that the main lobe of the means for filtering the signal in the frequency domain includes the following characteristics:
a maximum response occurs substantially at a center frequency of the main lobe, and
the response monotonically decreases on both sides away from the center frequency of the main lobe.

20. The mobile device of claim 11, wherein a frequency response of the means for filtering is such that the side lobes on both sides of the main lobe are suppressed equally in the time domain.

21. An access point, comprising:
means for receiving a signal from a mobile device;
means for filtering the signal received from the mobile device to generate a filtered signal, the means for filtering the signal having applied characteristics of suppressed side lobes adjustable in a time domain and a main lobe having a width adjustable in a frequency domain based upon a signal-to-noise ratio (SNR) to the signal; and
means for estimating a shortest time of arrival for the signal received from the mobile device based upon the main lobe of the filtered signal,
wherein the means for filtering has the applied characteristics such that the side lobes on both sides of the main lobe are suppressed in the time domain to a greater degree than side lobes on both sides of a main lobe of a sinc filter response in the time domain.

22. The access point of claim 21, further comprising:
means for receiving a round trip time (RTT) request from the mobile device;
means for preparing an RTT packet in response to the RTT request; and
means for transmitting the RTT packet to the mobile device,
wherein the signal received from the mobile device from which the filtered signal is generated comprises an acknowledgment (ACK) packet for estimating a shortest RTT of signal travel between the access point and the mobile device.

23. The access point of claim 22,
wherein the means for preparing the RTT packet in response to the RTT request comprises means for filtering the RTT packet to generate a filtered RTT packet, and
wherein the means for transmitting the RTT packet to the mobile device comprises means for transmitting the filtered RTT packet to the mobile device.

24. The access point of claim 23, wherein the means for filtering the RTT packet has characteristics of suppressed side lobes adjustable in the time domain and a main lobe having a width adjustable in the frequency domain based upon the SNR.

25. The access point of claim 24, wherein a width of the main lobe of the means for filtering the RTT packet is larger than a width of the main lobe of the means for filtering the signal which comprises the ACK packet in the frequency domain.

26. The access point of claim 24, further comprising means for transmitting the characteristics of the means for filtering the RTT packet to the mobile device.

27. The access point of claim 23,
wherein a frequency response of the means for filtering the signal is such that a width of the main lobe of the means for filtering the signal in the frequency domain is substantially equal to a width of a spectrum of received signals in the frequency domain, and
wherein a frequency response of the means for filtering the RTT packet is such that a width of the main lobe of the means for filtering the RTT packet in the frequency domain is wider than the width of the spectrum of received signals in the frequency domain.

28. The access point of claim 21, wherein a frequency response of the means for filtering the signal is such that the main lobe of the means for filtering the signal in the frequency domain includes the following characteristics:
a maximum response occurs substantially at a center frequency of the main lobe, and
the response monotonically decreases on both sides away from center frequency of the main lobe.

29. The access point of claim 21, wherein a frequency response of the means for filtering is such that the side lobes on both sides of the main lobe are suppressed equally in the time domain.

* * * * *